June 12, 1951 E. P. PALMATIER 2,556,736
DE-ICING SYSTEM FOR AIRCRAFT
Filed June 22, 1945 5 Sheets-Sheet 1
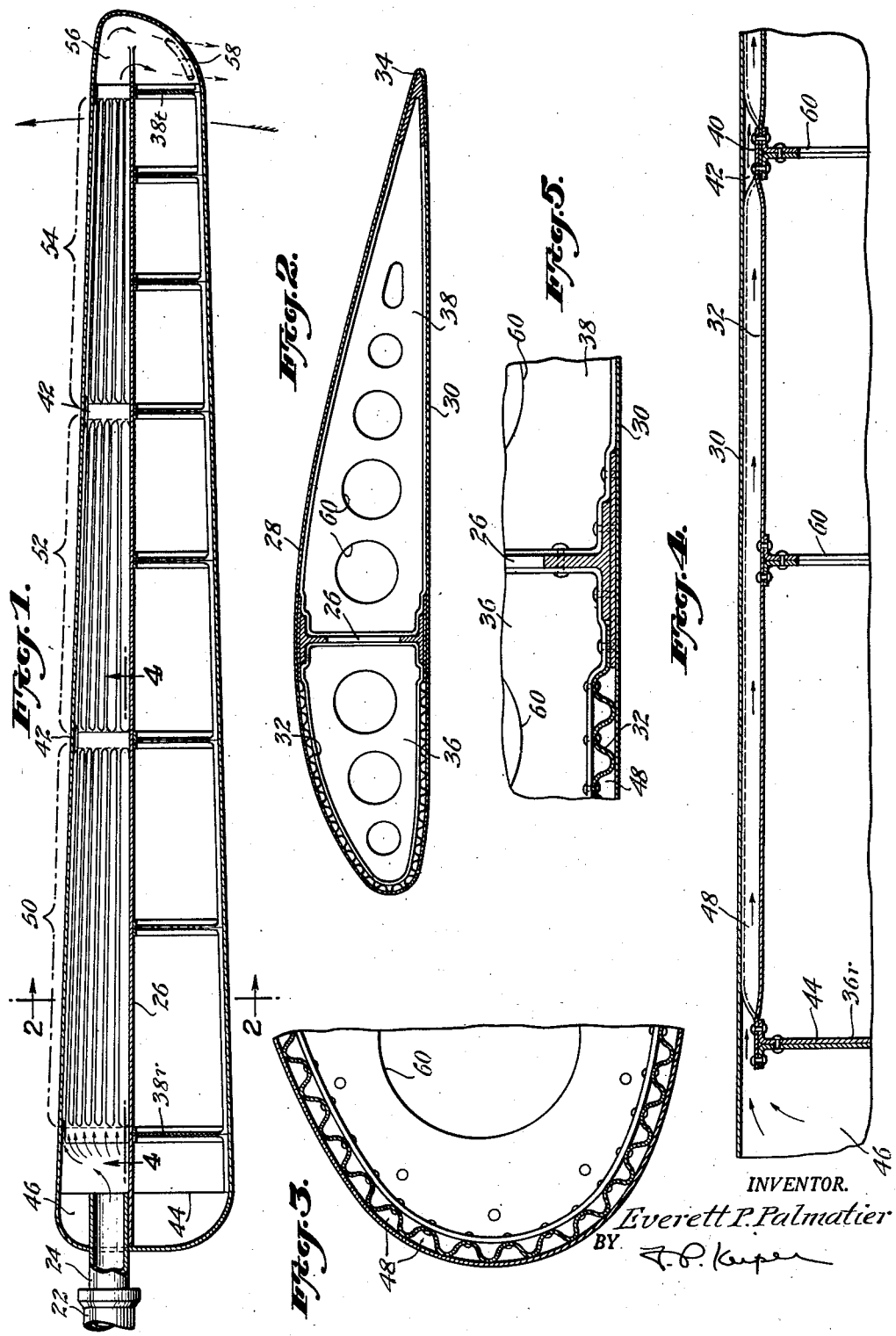
INVENTOR.
Everett P. Palmatier
BY

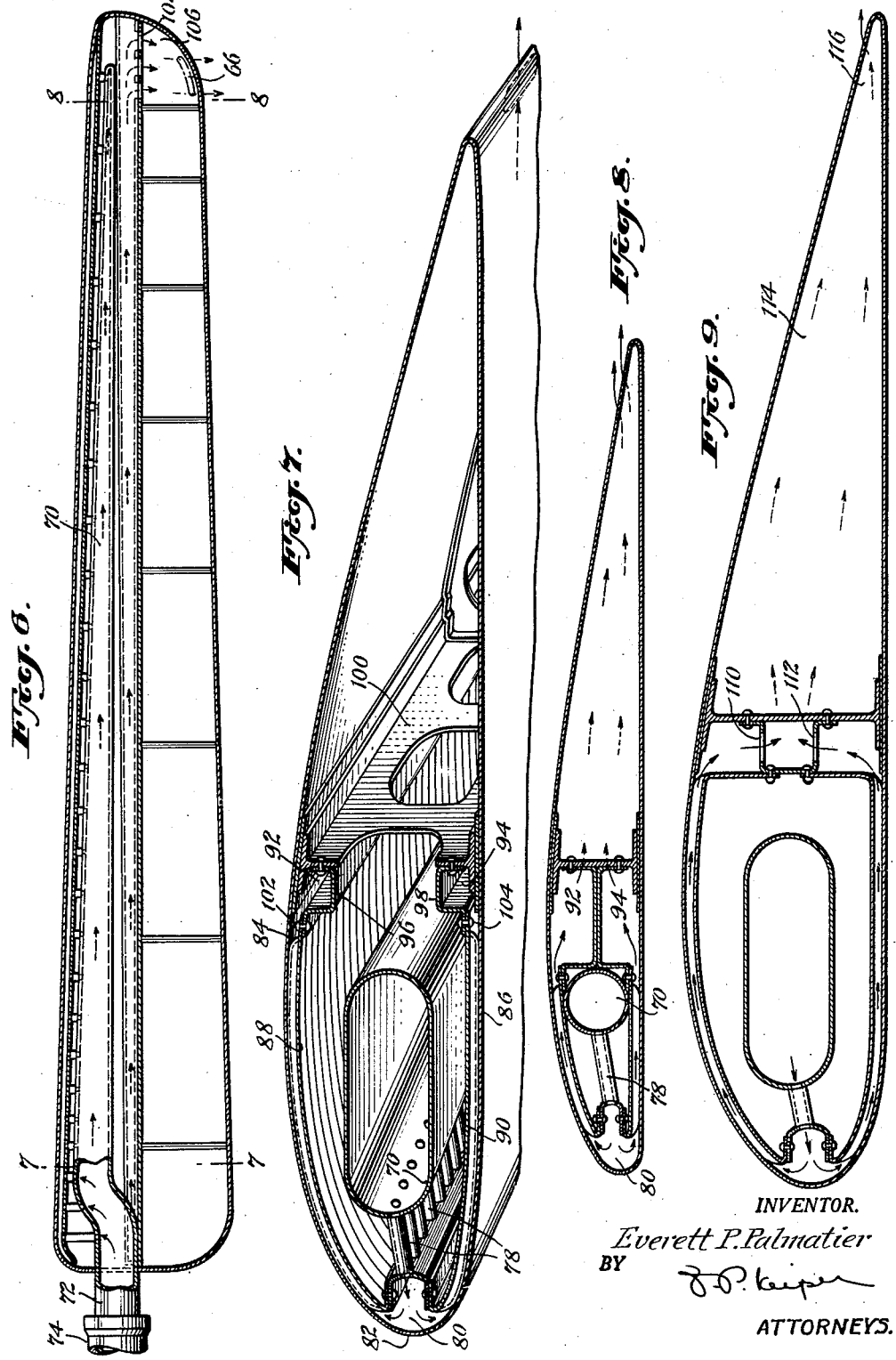

June 12, 1951     E. P. PALMATIER     2,556,736
DE-ICING SYSTEM FOR AIRCRAFT
Filed June 22, 1945     5 Sheets-Sheet 3
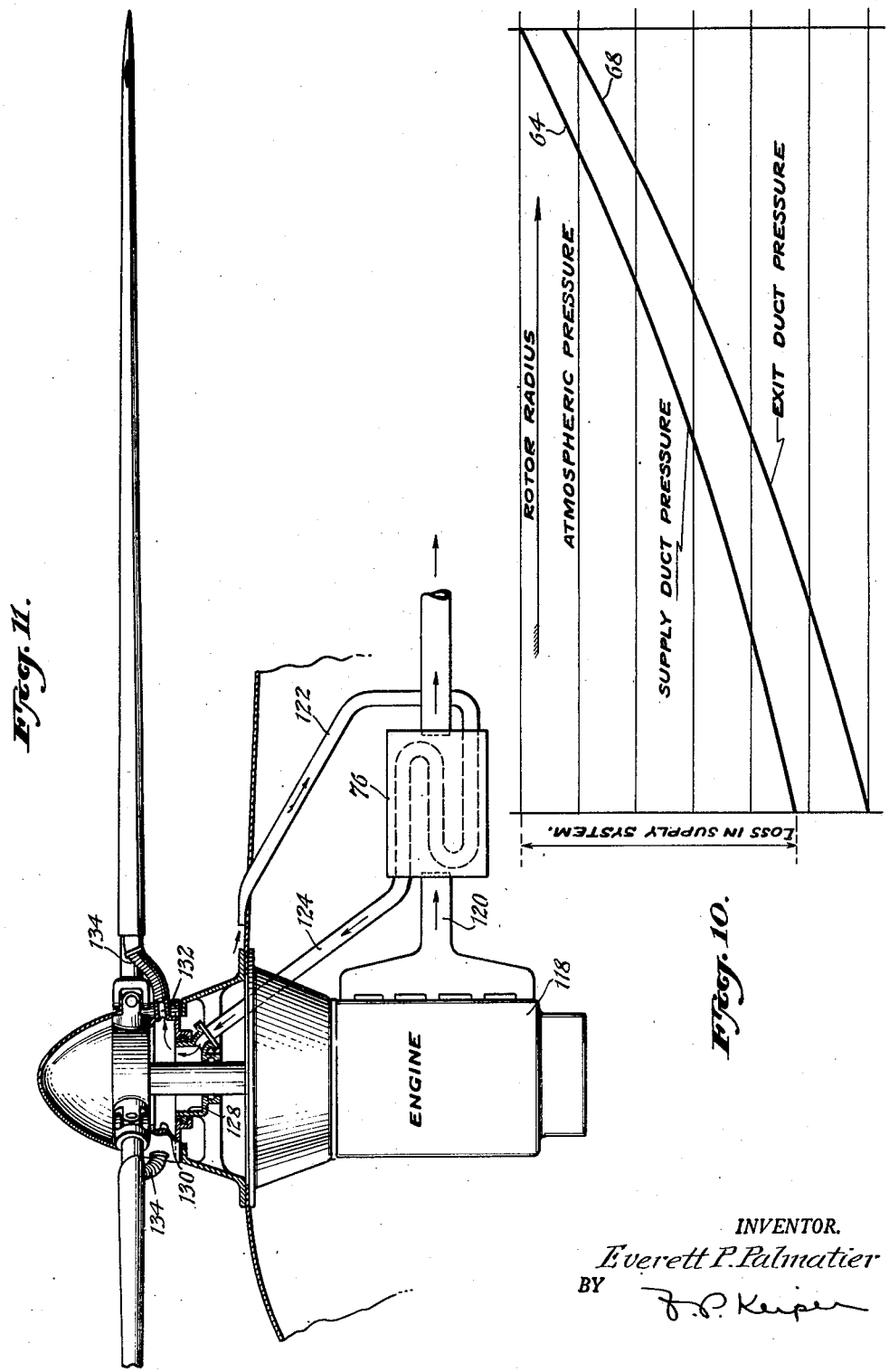
INVENTOR.
Everett P. Palmatier
BY June 12, 1951 E. P. PALMATIER 2,556,736
DE-ICING SYSTEM FOR AIRCRAFT
Filed June 22, 1945 5 Sheets-Sheet 4
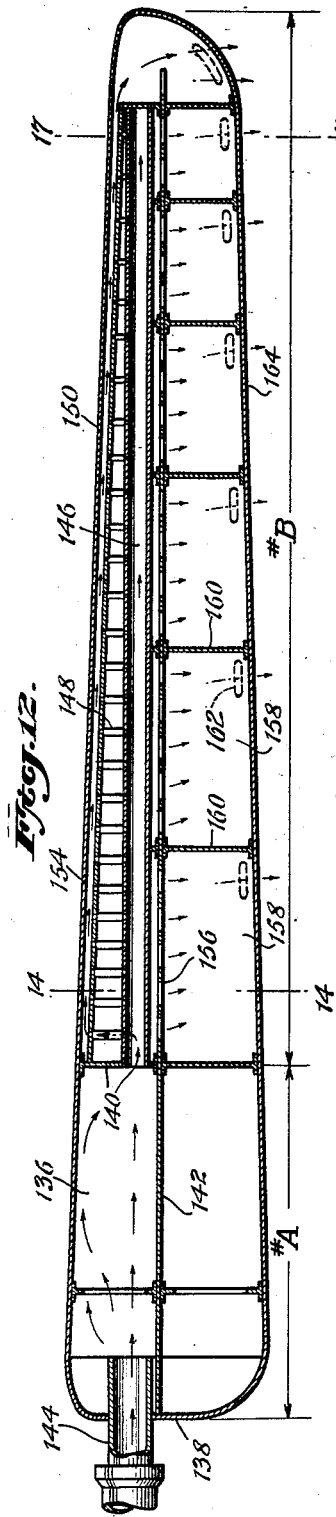
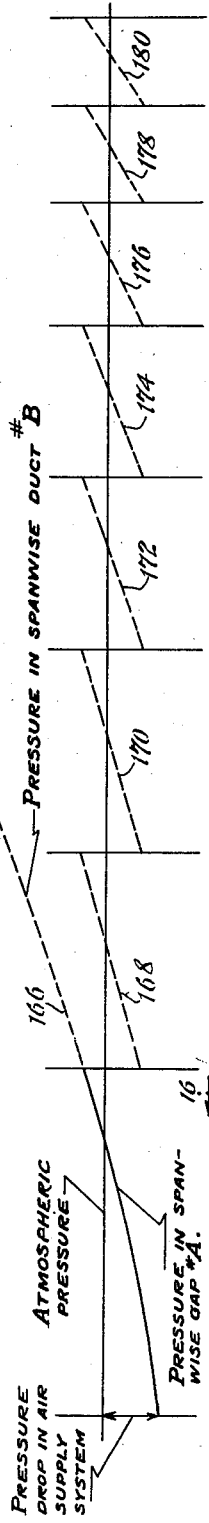
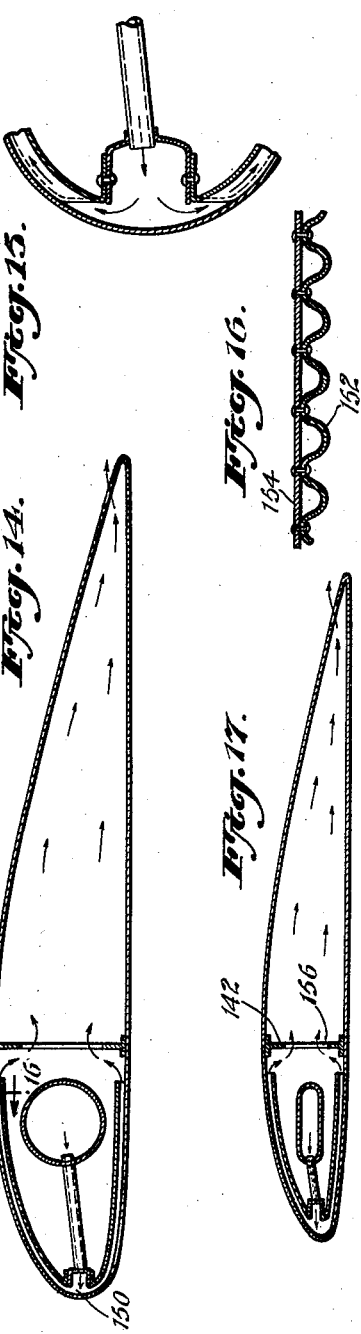
INVENTOR.
Everett P. Palmatier
BY June 12, 1951 E. P. PALMATIER 2,556,736
DE-ICING SYSTEM FOR AIRCRAFT
Filed June 22, 1945 5 Sheets-Sheet 5
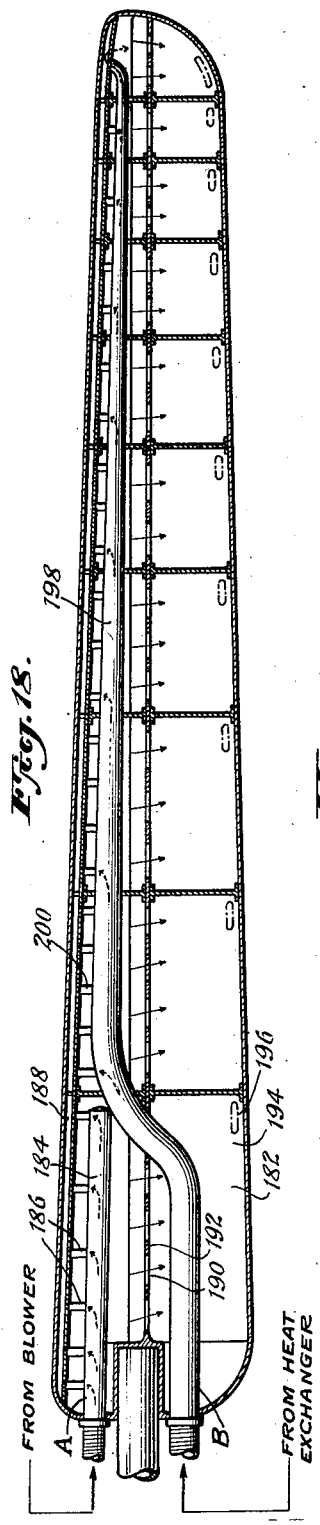
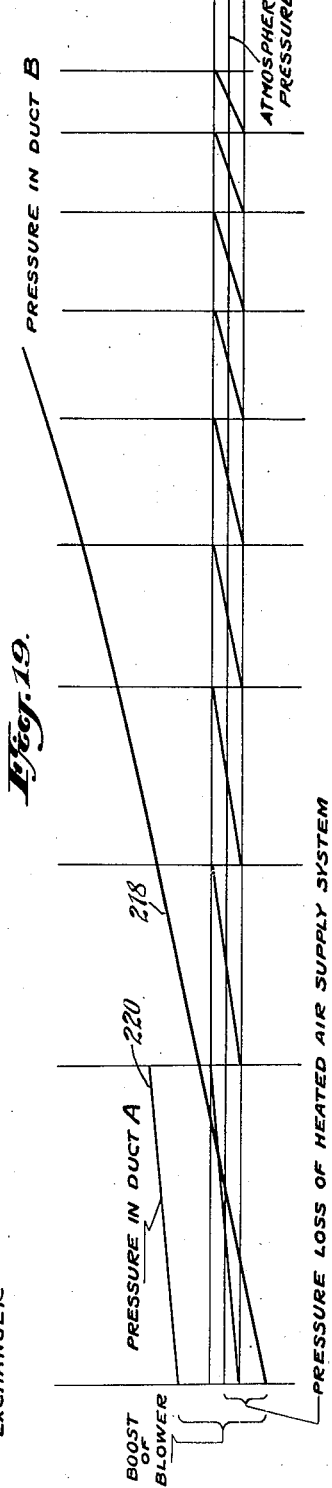
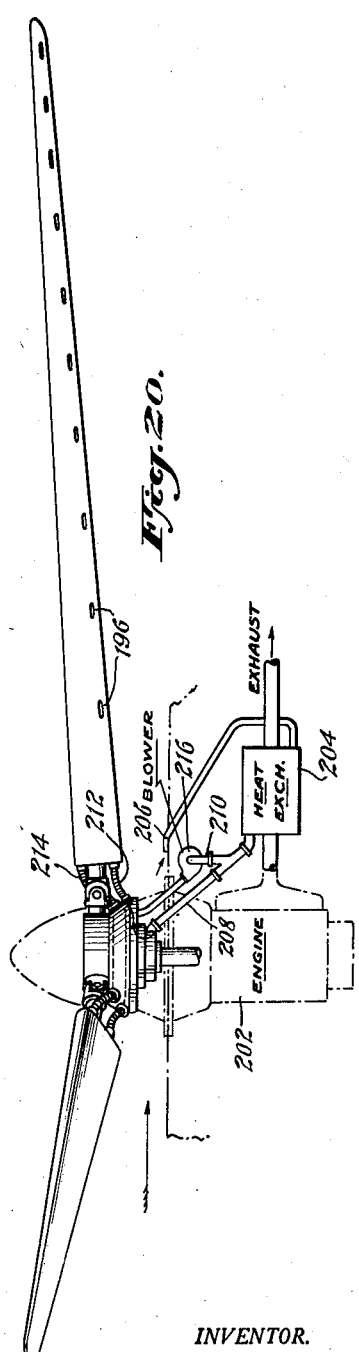
INVENTOR.
Everett P. Palmatier
BY Patented June 12, 1951

2,556,736

UNITED STATES PATENT OFFICE 2,556,736

DEICING SYSTEM FOR AIRCRAFT

Everett P. Palmatier, Solvay, N. Y., assignor to Curtiss-Wright Corporation, a corporation of Delaware Application June 22, 1945, Serial No. 600,938

4 Claims. (Cl. 244—134)

This invention relates to a system for the de-icing of rotor blades of helicopters and like structures.

In the de-icing of aircraft wings by the distribution of heated air through the hollow wing adjacent the wing surfaces, it has usually been possible to employ the "ramming" action of the plane, due to its headway, to create a positive pressure head to force circulation of air through heat exchangers and de-icing passages. The ramming action and the positive pressure established thereby in combination with suction derived by employing exhaust ports adjacent the trailing edges of the top surfaces of the wings has been sufficient to create a flow of heated medium through a heat exchanger and the internal cavities provided within the wing. In helicopters the ramming action is absent during hovering and the wide range of velocities at various stations along the length of the rotor blades, combined with the wide pressure differences due to centrifugal force prevents the satisfactory application of the ordinary wing de-icing systems to such rotating blades.

It is accordingly an object of the present invention to provide in combination with a rotor blade, a system for distributing heated fluid within the blade in heat-exchange relation with substantially the entire forward skin surface of the rotor to prevent ice formation on the external surface thereof.

Another object of the invention is to provide a distribution system within such a blade employing the centrifugal force therein for distributing heated gases in heat-exchange relation with that portion of the surface of the wing normally susceptible to ice formation.

A further object of the invention is the provision in a rotor blade of the type described a system having separate spanwise inlet and exhaust ducts and having a transversely extending distribution system between the ducts along substantially the entire length of the blade.

A still further object of the invention is to provide a distribution system within such a blade wherein auxiliary means is employed for increasing the effectiveness of the de-icing system over a section of the blade adjacent its root end.

Yet another object of the invention is to provide in a structure of the nature set forth an arrangement for distributing heated gases within the blade in such a manner as to be effective in heating the surfaces subject to the formation of ice and at the same time providing a structure which coacts with and forms a part of the blade structure in resisting the stresses to which the blade is subjected during normal operation thereof.

The above and other novel features of the invention will appear more fully hereinafter from the following detailed description when taken in conjunction with the accompanying drawings. It is expressly understood however that the drawings are employed for purposes of illustration only and are not designed as a definition of the limits of the invention, reference being had for this purpose to the appended claims.

In the drawings, wherein like reference characters indicate like parts:

Figure 1 is a longitudinal, horizontal sectional view of a helicopter rotor wing constructed in accordance with one form of the invention;

Fig. 2 is a transverse section of Fig. 1 taken substantially on the line 2—2;

Fig. 3 is an enlarged detailed sectional view of the nose portion of Fig. 2 and a part of the section taken on the line 2—2;

Fig. 4 is a longitudinal vertical section taken substantially on the line 4—4 of Fig. 1;

Fig. 5 is an enlarged fragmentary sectional view of the section shown in Fig. 2 taken at the intersection of the rotor spar and its lower skin surface;

Fig. 6 is a modified form of the invention illustrated in longitudinal horizontal section;

Fig. 7 is a transverse section of the modification shown in Fig. 6 taken substantially on the line 7—7;

Fig. 8 is a transverse section of the modification of Fig. 6 taken substantially on the line 8—8;

Fig. 9 is a modified form of the invention disclosed in Fig. 6, the modification being illustrated in transverse section and relating to the exhausting of heated gases from the blade;

Fig. 10 is a chart illustrative of the supply duct pressure and exit duct pressure along the length of the blade as applied to the modification of Fig. 6;

Fig. 11 is a diagrammatic showing of the engine and rotor combination of a helicopter disclosing the method of supplying heated air to the hollow rotor blades;

Fig. 12 is a longitudinal horizontal section taken through another form of the invention in which the construction is modified to increase the effectiveness of the de-icing system at the root end of the blade;

Fig. 13 is a chart illustrative of the pressures present in the supply ducts of a de-icing system such as that shown in Fig. 12;

Fig. 14 is a transverse section of Fig. 12 taken substantially on the line 14—14;

Fig. 15 is an enlarged fragmentary transverse section of the nose portion of Fig. 14 and taken on the line 14—14 of Fig. 12;

Fig. 16 is a fragmentary sectional view taken substantially on the line 16—16 of Fig. 14;

Fig. 17 is a transverse section of the rotor of Fig. 12 taken on the line 17—17;

Fig. 18 is a further modified form of the invention illustrated in longitudinal horizontal section wherein the supply of heated air to the root end is effected under pressure;

Fig. 19 is a diagram illustrative of the pressures present at the various stations of the blade shown in Fig. 18 and illustrating the presence of positive pressure in the root section of the blade; and Fig. 20 is a diagrammatic showing the engine and rotor supply system for the modification of Fig. 18.

Referring to the drawings and particularly the modification of Figs. 1 through 5, there is shown a rotor blade construction supported from a hub socket 22 and tubular stem 24, the tubular stem extending into the blade and being rigidly secured to a longitudinal spar 26 extending substantially the entire length of the rotor. Top and bottom skin sheets 28 and 30 respectively, forming an airfoil section are arranged about the spar 26, the spar being positioned along the plane of substantially greatest airfoil thickness. The skin sheets 28 and 30, forward of the spar from a nose section and are reinforced by a corrugated backing sheet 32, the corrugations of which extend spanwise of the rotor. The airfoil shape is maintained by a plurality of forward web sections 36 and trailing edge web sections 38 suitably spaced along the length of the blade which latter web sections cooperate with the trailing portions of the skin sheets 28 and 30 to form a trailing edge 34.

The web sections, as illustrated, are each formed from a pair of stampings arranged back to back with peripheral flanges adapted to be secured to the corrugated sheet 32 at the points of contact. As illustrated in Fig. 4, the corrugated sheet at alternate web stations or as desired may be flattened as at 40 to effect joints between successive sheets and at the same time provide a redistribution chamber 42 the purpose of which will hereinafter appear. The skin sheets 28 and 30 may be secured to the corrugated sheet at spaced intervals along the lines of contact by spot welding or by other means as may be found desirable and the skin sheets covering the trailing edge may be secured to the flanges of the webs 38 at frequently spaced intervals by spot welding, riveting or any suitable fastening means.

The webs 36r and 38r nearest the root end 44 form a hollow chamber 46 into which the hollow tubular stem 24 leads. From such chamber hot air or hot gases are distributed to the multiplicity of air passages 48 formed between the undulations of the corrugated sheet 32 and the skin surfaces 28 and 30, so that hot gases delivered to the chamber 46 are caused to flow spanwise of the rotor adjacent to the forward skin surface to heat the surface and prevent ice formation on the exterior surface thereof or to loosen ice formed thereon.

At spaced intervals along the length of the blade the air passages 48 enter into a transverse distributing chamber 42 from whence such heated air is again directed to passages 48 of the succeeding section of the rotor, the rotor illustrated being formed in three sections, 50, 52 and 54.

The tip of the blade is provided with an exhaust chamber 56 into which the passages 48 of the section 54 discharge. The chamber 56 in turn is provided with an exhaust port 58 to atmosphere in the trailing edge of the tip preferably in the top surface thereof adjacent the trailing edge. With the exception of the root chamber 46 and the tip chamber 56 which in the form shown are separated from the intermediate chambers by webs such as 38r and 38t acting as bulkheads the intervening webs 36 and 38 are provided with apertures 60 permitting the intercommunication between the spaces intervening between the root chamber and the tip chamber so that circulation of air therewithin to the end that uniform temperature may be maintained is effected.

It will appear that with the construction shown that at the root end of the blade the channels 48 will be of larger cross-section or more numerous with a resulting greater cross-sectional area for the transmission of heated gases therethrough whereas the cross-section will be gradually reduced toward the tip end. Since the pressure is greatest at the tip end due to centrifugal force and the flow of fluid more rapid, there is a greater opportunity for heat exchange at the tip end than at the root end but since the heated fluid in passing through the blade will lose heat as it progresses therethrough the increased velocity at the tip end assures a sufficiently uniform and effective heating of that portion of the rotor blade.

In such a construction as that shown the corrugations in combination with the skin and the longitudinal spar 26 coact to form a D section throughout the length of the blade which is but a modification of a box girder section and therefore rigidity of the blade is provided by the construction described to the end that a thinner skin, and lighter spars and rib construction may be employed without sacrifice of necessary strength.

While the modification described is applicable to blades of relatively light construction, the distribution system of heated gases therein may be further improved by an arrangement such as that disclosed in Figs. 6 through 10 wherein separate supply and exit ducts are employed extending lengthwise of the rotor blade. Since the pressure within a duct extending lengthwise of a rotating blade increases geometrically as the tip of the blade is approached the distribution of fluid from such a duct would prove irregular because of the extremes in pressures variation. The pressure existing in a duct extending lengthwise of a rotor blade such as 70 is diagrammatically illustrated in Fig. 10 by the curve 64 and a duct such as 94 connected to an exhaust port such as 66 in the tip of a rotor blade would have therein along its length a pressure generally indicated by the curve 68 of Fig. 10. In the construction disclosed in Figs. 6–9, means are provided for conducting fluid from the supply duct to the exit duct, the means employing the pressure difference illustrated by the vertical spacing between the curves 64 and 68 of Fig. 10, along the length of the blade.

In order to provide a structure for distributing fluid in the manner set forth, the rotor disclosed in Fig. 6 is provided with a supply duct 70 having a connection through the hollow stem 72 to the rotor hub 74, and a source of heated air 76 (see Fig. 11). The supply duct 70 is provided with a plurality of forwardly extending tubular passages 78 leading into a nose duct 80 extending along the length of the nose 82 of the rotor and providing in general a nose distribution channel or chamber. The top and bottom skin sheets 84 and 86 of the rotor coact with fore and aft extending corrugating backing sheets 88 and 90 to provide fore and aft extending passages formed between corrugating sheets and the adjacent skin sheets for the transmission of fluid from the nose chamber 80 to a position adjacent the central greatest section of the airfoil whence the fluid flows into discharge or exit ducts 92 and 94 formed from channelled members 96 and 98 secured to the central spar of the blade 100 and the flattened edges 102 and 104 of the corrugated sheets 88 and 90. The exit ducts 92 and 94 lead lengthwise of the spar towards the tip end and exhaust into a tip chamber 106 through ports 108 whence the fluid is discharged to the surrounding atmosphere through the exhaust port 66 adjacent the trailing edge and at the top surface of the rotor blade.

Reference to Fig. 8 discloses the manner in which the supply duct 70 preferably decreases in cross-section as the tip is approached, and the manner in which the exit ducts 92 and 94 increase in cross-section at the tip end in order to accommodate the variation in volume of gas at any particular point. In the modification shown in Fig. 9, the exit ducts are provided with ports 110 and 112 permitting the flow of the spent gases into the trailing edge chambers 114 whence at various points along the blade the gases are permitted to exhaust to atmosphere through exhaust ports 116. In this latter modification, as in the modification of Fig. 6, the distribution of the heating fluid to the various portions of the blade and particularly the nose distribution chamber 80 may be regulated by the size and length of the passages 78 and compensation for various factors resulting from the differing distribution pressures existing may be effected by constricting or pinching certain of the passages 78 in order to regulate the flow of fluid therethrough.

In Fig. 11, there is diagrammatically illustrated the engine and rotor combination, the engine being of the internal combustion type having waste heat in the form of exhaust gases. The engine indicated by the reference character 118 is provided with an exhaust pipe 120 leading to a heat exchanger 76 into which a supply of air at atmospheric pressure is introduced through the duct 122 and from which the heated air is taken through a conduit 124. The heated air is led into a rotor hub chamber having a stationary wall 128 and a rotary wall 130, the rotary wall being provided with blade distribution ports 132 for directing the heated air into the rotor blades either through the hollow stems as heretofore described or through separate flexible conduits such as 134 as illustrated.

In Figs. 12 through 17, the invention has been modified in that exhaust of the heat spent gases from the trailing edge is allowed at spaced points along the length of the rotor blade corresponding to the blade sections as formed by the spaced ribs. In such a construction, the relatively low pressure at the inboard or root end of the blade is insufficient to assure a sufficient discharge through a trailing edge exhaust port so that the root end of the blade is provided with an enlarged chamber 136 offering a minimum of resistance to flow arranged between the root end 138, the rib bulkhead 140, skin 154, and the spar 142. The entire supply of heated medium enters the chamber 136 through the hollow stem 144 and is withdrawn from the chamber into a pressure supply duct 146 extending from the rib 140 to a point adjacent the tip end of the blade.

Discharge from the supply duct to the sections of the blade beyond the chamber 136 is effected through a multiplicity of tubular passages 148 leading into a nose channel 150 whence the fluid is divided and distributed aft of the blade and in contact with the inner surface of the top and bottom skin sheet through the passages formed by the undulations of a corrugated backing sheet 152 secured to the inner surface of the skin sheet 154. The corrugated backing terminates, as is shown in Figs. 14 and 17, short of the spar 142 and the heated medium discharged therefrom is permitted to pass through apertures 156 arranged in and along the length of the spar, into the cavities 158 therebehind formed between the rib bulkheads 160. From the rear cavities the spent fluid is discharged through exhaust ports 162 in the skin sheets adjacent the trailing edge 164.

The presence of the reduced pressure in the root chamber 136 is illustrated in Fig. 13 by the pressure curve 166 illustrating a sub-atmospheric pressure condition in the larger portion of the chamber 136 with the pressure rising to above atmosphere at stations along the blade beyond the rib bulkhead 140. The pressures existing within the rear cavities 158 are represented by the curves 168, 170, 172, 174, 176, 178 and 180, the curves corresponding to the successive section cavities from the inboard end of the blade to the outboard or tip end. It will be observed that the exhaust ports 162 in each of the cavities 158 are arranged at the outboard end of the cavity or a point which corresponds to the portion of the curves 168 through 180, indicating a pressure above atmosphere.

In Figs. 18 through 20 special provision is made in view of the reduced or sub-atmospheric pressure likely to be present in the root end of a blade, the provision being a special or separate source of heated air from a blower adapted to boost the pressure of a small percentage of the total heated air. In Fig. 18 it will appear that the inboard or root section 182 is supplied with heated air through a special independent duct or manifold 184 having tubular passages 186 leading to a nose distribution channel 188 from whence the heated fluid is distributed aft of the blade, and in contact with the top and bottom inside surface of the skin sheet. The heated air is thereafter permitted to flow through apertures 190 in the spar 192 and thence into the rear cavity 194 to the exhaust port 196. The supply of heated medium to the remainder of the blade is effected in a manner similar to that shown in Fig. 12, the main pressure supply duct 198 being provided with tubular passages 200 from whence the heated fluid is distributed in contact with the inside surface of the forward portions of the skin sheet of the blade.

In Fig. 20, there is disclosed a system for supplying heated air to the modification of Fig. 18. As shown, the rotor and its blades are drivably connected to an internal combustion engine 202 whose waste heat in the form of exhaust gases passes through a heat-exchanger 204 to heat a supply of air drawn into the air intake 206. The heated air is distributed to the rotor blades through divided passages 208 and 210, the passage 208 being connected to the duct 198 (see Fig. 18) through a flexible conduit 212. The passage 210 is connected to the duct 184 through a flexible connection 214, and is provided with a blower 216 for the purpose of boosting the pressure of the supply to the root portion of the blade and duct 184. For the purpose of distributing the heated air from the passages 208 and 210 to the rotor and blades carried thereby, double distribution chambers, each functioning similar to the chamber 126 of Fig. 11, are provided as will be readily understood.

Fig. 19 discloses the distribution of pressure throughout the length of the blade illustrated in Fig. 18. The curve 218 discloses the presence of sub-atmospheric pressure at the root end of the duct 198 and the presence of ample above-atmospheric pressure beyond a set point spaced partway along the blade from the root end. Through the application of a blower the pressure is boosted in supplying the duct 184 and the curve 220 indicates the pressure existing within and along the length of the duct 184, the pressure being a sufficient amount above-atmospheric pressure to assure the circulation of a proper amount of heated fluid to effect all de-icing requirements in the root or inboard section.

It will, of course, be appreciated that in any of the modifications that the application of heated air to the inside surface of the skin sheets forming the forward portion of the rotor blades will prevent the adherence of ice upon the outside surface of the blades. Should ice form upon the exterior surface over a substantial area or the entire area of the forward portions of the blades, such ice acts as an insulator to the escape of heat generated within. The heat supplied from within over such area of the wing as is covered by the ice, because of the insulating effect of such ice coating, is rendered increasingly effective to fuse the ice and its surface contact with the skin and to thereby loosen and break the bond between such ice and the blade skin outer surface. Thus, a proper distribution of heated air throughout the length of the rotor blades as set forth, will effectively prevent the formation of ice thereon as well as remove such ice as may be formed during a period when the heating system is cut off, as for example, when the engine is throttled for reducing altitude and consequently supplying little or no waste heat.

While the systems shown are adapted to operate on heated air, in practice, exhaust gases could be directly employed as well as heated vapor. In any event, the distribution of such gas as may be employed will in general be sufficiently uniformly distributed to supply the heat requirements of the various sections from root to tip, and the distribution may be readily varied by altering tube sizes or by pinching or contricting certain of the tubes as may seem desirable.

Although several forms of the invention have been illustrated and described, it is to be understood that the invention is not limited thereto but may be embodied in various modifications and arrangements as may be made without departing from the spirit of the invention, as will be apparent to those skilled in the art. Accordingly, reference will be had to the appended claims for a definition of the limits of the invention.

What is claimed, is:

1. In a rotary wing de-icing system, a heat producing engine, a rotor driven thereby having a plurality of hollow blades, means for dividing each hollow blade into an inboard compartment and an outboard compartment, means for heating a supply of air from the waste heat of said engine, blower means for delivering a portion of said air under pressure to the inboard compartments of said blades, connected by ducts to said blades, duct means for conducting another portion of said air from said heating means to the inboard end of the outboard compartments, and an exhaust port in the outer end of said outboard compartment radially outward of the inboard end of said outboard compartment, for discharging air to create suction upon the second delivering means by centrifugal action.

2. In an airfoil, top and bottom skin sheets defining hollow forward and trailing edge airfoil sections, a hot gas supply conduit extending spanwise through one of said sections in insulated relation to said airfoil surface, a distributing conduit extending spanwise in the nose of said forward section and formed in part by said skin sheets, means for connecting said distributing conduit at frequent intervals to said supply conduit, and a plurality of chordwise passages formed in part by said skin sheets, said passages leading from the distributing conduit along the inside surfaces of said skin sheets toward the trailing edge section and open thereto, said trailing edge section having at least one opening for the flow of spent hot gas to the atmosphere.

3. In a rotary wing system, a rotor hub having a hollow wing extending therefrom, means within and dividing said wing into inner and outer spanwise compartments in tandem relation, a pressurized heated gas supply having a delivery conduit connected to said inner spanwise compartment, a substantially unpressurized heated gas supply having a delivery conduit passing through said wing to said outer spanwise compartment, means within both said compartments to conduct the heated gas delivered thereto over the inner surface of the wing adjacent the wing leading edge, and means to exhaust spent heated gas after its passage adjacent the wing leading edge.

4. In a rotary wing system, a rotor hub having a hollow wing extending therefrom, means within and dividing said wing into inner and outer spanwise compartments in tandem relation, a heated gas supply means having a conduit connection therefrom to the root of said wing and thence to the outer spanwise compartment, a second conduit from said heated gas supply means, a blower fed from said supply means and including an outlet opening having a conduit connection to the inner spanwise compartment, means in said wing, in each compartment, to conduit heated gas from said compartments over the inner surface of the wing adjacent the wing leading edge, and means to exhaust spent heated gas after gas passage adjacent the wing leading edge.

EVERETT P. PALMATIER.

REFERENCES CITED

The following references are of record in the file of this patent:

UNITED STATES PATENTS

| Number | Name | Date |
|---|---|---|
| 1,821,776 | Vining | Sept. 1, 1931 |
| 1,827,276 | Alfaro | Oct. 13, 1931 |
| 1,932,681 | Smith | Oct. 31, 1933 |
| 2,046,521 | Mahaffey | July 7, 1936 |
| 2,119,806 | Dornier | June 7, 1938 |
| 2,142,699 | Riddle | Jan. 3, 1939 |
| 2,160,397 | Brammer | May 30, 1939 |
| 2,256,393 | Klien | Sept. 16, 1941 |
| 2,272,358 | Steinhaus | Feb. 10, 1942 |
| 2,320,870 | Johnson | June 1, 1943 |
| 2,469,480 | Sikorsky | May 10, 1949 |
| 2,478,878 | Smith et al. | Aug. 9, 1949 |

FOREIGN PATENTS

| Number | Country | Date |
|---|---|---|
| 137,082 | Great Britain | Jan. 8, 1920 |
| 687,481 | France | Apr. 28, 1930 |